Figure 1:
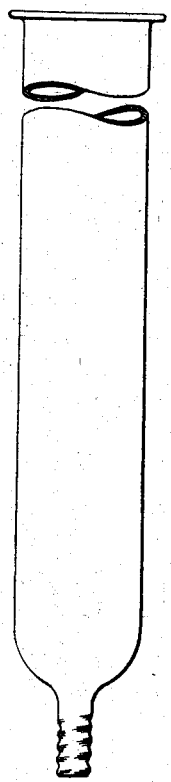

No. 706,541. Patented Aug. 12, 1902.
L. FEVAL.
PROCESS OF MAKING COLLAPSIBLE TUBES, &c.
(Application filed Jan. 2, 1902.)

(No Model.)

Witnesses:
Jas. F. Coleman
Jno. Robt Taylor

Inventor
Leon Feval
By Dyer Edmunds & Dyer
Attorneys

UNITED STATES PATENT OFFICE.

LEON FEVAL, OF NEW BRUNSWICK, NEW JERSEY, ASSIGNOR, BY MESNE ASSIGNMENTS, TO TRANSPARENT CELLULOSE PRODUCTS COMPANY, OF NEW BRUNSWICK, NEW JERSEY, A CORPORATION OF NEW JERSEY.

PROCESS OF MAKING COLLAPSIBLE TUBES, &c.

SPECIFICATION forming part of Letters Patent No. 706,541, dated August 12, 1902.

Application filed January 2, 1902. Serial No. 88,107. (No specimens.)

*To all whom it may concern:*

Be it known that I, LEON FEVAL, a citizen of the Republic of France, residing at New Brunswick, in the county of Middlesex and State of New Jersey, have invented a certain new and useful Improvement in Processes of Making Collapsible Tubes and other Tubular Articles, of which the following is a description.

The object of this invention is to produce a simple and effective process for the manufacture of collapsible tubes and other tubular articles from pyroxylin.

In making my collapsible tube or other tubular article I employ a solution of pyroxylin dissolved, preferably, in amyl acetate and mixed with a drying oil or oils. The tube is formed by dipping a suitable former in the solution one or more times, according to the desired thickness, and drying after each dipping. The former is preferably a glass tube having the shape and size desired, and in the case of a collapsible tube or other tubular article having a contracted screw-threaded neck the former is provided at its lower end with a contracted neck, upon which is formed a rounded spiral thread. After the proper thickness of material has been formed upon the former and dried thereon the former, with its coating, is placed in boiling water and allowed to remain ten minutes or more, when it is removed, and after it has cooled down sufficiently to permit it to be handled the pyroxylin coating is removed from the former by turning it upon the former, so as to unscrew the engaging screw-threads, or, if there is no screw-thread, the tube can be slipped off of the former by a direct longitudinal movement, or the former and its casting may be placed in an atmosphere of wet steam for the same length of time and the tube removed from the former in the same manner. The effect of the heat and moisture is to disengage the pyroxylin tube from the former and permit it to be readily slipped off of the former. This result, I believe, is due to the combined effect of the heat and moisture, since I have found that the same result cannot be secured by heating the former and its coating in a dry atmosphere. After the pyroxylin tube is removed from the former it is preferably boiled in water for an hour or more to evaporate the solvent and remove the odor of amyl acetate, or this same result can be secured by heating in wet steam or in a dry atmosphere of air or steam. After this is done and the tube is dried, if it has been subjected to moisture, it is cut off at the ends in a suitable machine to give it the proper length and remove any surplus material at the neck of the tube, when the tube is ready to receive its screw-cap and be filled in the ordinary way. The bottom of the tube is preferably closed by a metal clip, which is squeezed over the material of the tube after it is folded to close the bottom.

The composition which I prefer to employ in the manufacture of my tube is composed of pyroxylin, one pound; amyl acetete, one and one-half gallons; castor-oil, one pound; linseed-oil varnish, three ounces. I do not wish to limit myself to this exact composition; but I have found that it is effective to secure the result stated. The tube made of this composition will be transparent and practically colorless. Any desired color may be given to the tube by adding to the solution a suitable amount of coloring-matter, for which purpose I prefer to use anilin colors, which are not soluble in water, but are soluble in the solution. While I prefer not to add sufficient coloring-matter to destroy the transparency of the tube, yet it is evident that that may be done.

Figure 2:
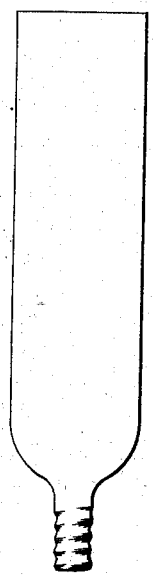

In the accompanying drawings, Figure 1 is an elevation of a glass former suitable for the making of collapsible tubes by the dipping process already explained, and Fig. 2 is an elevation of the tube removed from the former.

What I claim is—

1. The process of molding hollow articles from a pyroxylin composition, consisting in dipping a non-collapsible former in a solution of the pyroxylin composition and drying the coating thereon, then subjecting the former and its coating to the action of a moist heat at least equal to that of boiling water to loosen the coating from the former, and then removing the coating from the former, substantially as set forth.

2. The process of molding hollow articles from a pyroxylin composition, consisting in dipping a non-collapsible former in a solution of the pyroxylin composition and drying the coating thereon, then immersing the former and its coating in boiling water to loosen the coating from the former, and then removing the coating from the former, substantially as set forth.

3. The process of molding hollow articles from a pyroxylin composition, consisting in dipping a non-collapsible former in a solution of the pyroxylin composition and drying the coating thereon, then subjecting the former and its coating to the action of a moist heat at least equal to that of boiling water to loosen the coating from the former, then removing the coating from the former, and then subjecting the removed coating to the action of heat to evaporate the pyroxylin solvent, substantially as set forth.

4. The process of molding hollow articles from a pyroxylin composition, consisting in dipping a non-collapsible former in a solution of the pyroxlin composition and drying the coating thereon, then subjecting the former and its coating to the action of a moist heat at least equal to that of boiling water to loosen the coating from the former, then removing the coating from the former, and then boiling the removed coating in water to evaporate the pyroxylin solvent, substantially as set forth.

5. The process of molding hollow articles from a pyroxylin composition, consisting in dipping a non-collapsible former in a solution of the pyroxylin composition and drying the coating thereon, then immersing the former and its coating in boiling water to loosen the coating from the former, then in removing the coating from the former, and finally subjecting the removed coating to the action of heat to evaporate the pyroxylin solvent, substantially as set forth.

6. The process of making collapsible tubes or other tubular articles, consisting in dipping a non-collapsible former of suitable form in a solution of pyroxylin composition and drying the coating thereon, then in immersing the former and its coating in boiling water to loosen the coating from the former, then removing the coating from the former, and finally boiling the removed coating in water to evaporate the pyroxylin solvent, substantially as set forth.

This specification signed and witnessed this 16th day of December, 1901.

LEON FEVAL.

Witnesses:
JNO. ROBT. TAYLOR,
JOHN LOUIS LOTSCH.